United States Patent
Ma et al.

(10) Patent No.: US 12,481,914 B2
(45) Date of Patent: Nov. 25, 2025

(54) SYSTEM AND METHOD TO GENERATE INSIGHT TEMPLATES FOR RISK PROBABILITY ANALYSIS

(71) Applicant: INTERNATIONAL BUSINESS MACHINES CORPORATION, Armonk, NY (US)

(72) Inventors: Yi-Hui Ma, Mechanicsburg, PA (US); Shuyan Lu, Cary, NC (US); Eugene Irving Kelton, Wake Forest, NC (US); Willie Robert Patten, Jr., Hurdle Mills, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1105 days.

(21) Appl. No.: 17/478,486

(22) Filed: Sep. 17, 2021

(65) Prior Publication Data
US 2023/0087583 A1    Mar. 23, 2023

(51) Int. Cl.
*G06N 5/01*    (2023.01)
*G06F 18/2113*    (2023.01)
(Continued)

(52) U.S. Cl.
CPC ......... *G06N 20/00* (2019.01); *G06F 18/2113* (2023.01); *G06F 18/22* (2023.01); *G06F 18/231* (2023.01); *G06N 5/01* (2023.01)

(58) Field of Classification Search
CPC .......... G06N 20/00; G06N 5/01; G06F 18/22; G06F 18/231; G06F 18/2113
See application file for complete search history.

(56) References Cited

U.S. PATENT DOCUMENTS 9,324,022 B2    4/2016    Williams, Jr. et al.
10,467,631 B2    11/2019    Dhurandhar et al.
(Continued)

FOREIGN PATENT DOCUMENTS

CN    109918511 B    *    6/2021

OTHER PUBLICATIONS

Sandhya Saisubramanian, etc., "Balancing the Tradeoff Between Clustering Value and Interpretability", published in arXiv as of Jan. 31, 2020, retrieved Feb. 14, 2025. (Year: 2020).*

(Continued)

*Primary Examiner* — Shourjo Dasgupta
(74) *Attorney, Agent, or Firm* — Scully, Scott, Murphy & Presser, P.C; Teddi Maranzano

(57) ABSTRACT

A system, platform, program product, and/or method for generating new composite insight templates that includes: running a machine learning model on a data set to obtain for each of a plurality of entities a risk score and feature-based insights; generating a list of top "n" features input to the machine learning model that contributes to the risk score for each entity; grouping entities based upon similar features input to the machine learning model that contributes to the risk score for each entity; generating a decision tree for at least one of the group of entities; extracting, from the decision tree generated for the at least one of the group of entities, one or more feature-based insights; generating, by applying subject matter input, a new composite insight based upon the one or more feature-based insights; and adding the new composite insight to insight templates.

18 Claims, 9 Drawing Sheets

(51) Int. Cl.
*G06F 18/22* (2023.01)
*G06F 18/231* (2023.01)
*G06N 20/00* (2019.01)

(56) References Cited

U.S. PATENT DOCUMENTS

| | | | | |
|---|---|---|---|---|
| 2009/0234791 | A1* | 9/2009 | Delmonico | G06N 5/045 706/50 |
| 2013/0346182 | A1* | 12/2013 | Cheng | G06Q 30/0242 705/14.41 |
| 2015/0309990 | A1* | 10/2015 | Allen | G06F 40/177 704/9 |
| 2016/0267483 | A1* | 9/2016 | Jenson | G06Q 20/4016 |
| 2019/0311367 | A1* | 10/2019 | Reddy | G06Q 20/4016 |
| 2021/0097425 | A1* | 4/2021 | Yang | G06N 20/00 |
| 2021/0295427 | A1* | 9/2021 | Shiu | G06N 5/04 |
| 2022/0051125 | A1* | 2/2022 | Ho | G06F 18/23213 |

OTHER PUBLICATIONS

Rodrigo Monteiro de Aquino, "Natural Language Explanations of Classifier Behavior", published via 2019 IEEE Second International Conference on Artificial Intelligence and Knowledge Engineering, Jun. 3-Jun. 5, 2019, retrieved May 30, 2025. (Year: 2019).*

Hamza R. Saad, "Use Bagging Algorithm to Improve Prediction Accuracy for Evaluation of Worker Performances at a Production Company", published via Saad, Ind Eng Manage 2018, 7:2, retrieved Jul. 28, 2025. (Year: 2018).*

Yan Wang, etc., "An Automatic Interaction Detection Hybrid Model for Bankcard Response Classification", published to arXiv as of Jan. 2, 2019, retrieved Jul. 28, 2025. (Year: 2019).*

Huseyin Ince, etc., "A Comparison of Data Mining Techniques for Credit Scoring in Banking: a Managerial Perspective", published via Journal of Business Economics and Management, vol. 10, pp. 233-240, 2009, retrieved Jul. 28, 2025. (Year: 2009).*

Steven Struhl, "Using classification tree analysis: a review of the method and a new software package for CHAID/CART", published on Nov. 1, 1995, retrieved Jul. 28, 2025. (Year: 1995).*

Wikipedia, "Chi-square automatic interaction detection", dated Feb. 24, 2021, retrieved Jul. 28, 2025 (Year: 2021).*

Llung Pranata, etc., "Segmenting and Targeting Customers Through Clusters Selection & Analysis", published via 2015 International Conference on Advanced Computer Science and Information Systems (ICACSIS), held Oct. 10-11, 2015 in Depok, Indonesia, retrieved Jul. 28, 2025. (Year: 2015).*

Flora M. Diaz-Perez, etc., "CHAID algorithm as an appropriate analytical method for tourism market segmentation", published via Journal of Destination Marketing & Management 5, pp. 275-282 (2016), retrieved Jul. 28, 2025. (Year: 2016).*

Flora M. Diaz-Perez, etc., "The use of the CHAID algorithm for determining tourism segmentation: A purposeful outcome", published via Heliyon 6 (2020), retrieved Jul. 28, 2025. (Year: 2020).*

"The Ultimate Guide to Decision Trees for Machine Learning", published on Sep. 10, 2020 to https://www.keboola.com/blog/decision-trees-machine-learning, retrieved Jul. 28, 2025. (Year: 2020).*

Juan Laborda, etc., "Feature Selection in a Credit Scoring Model", published Mar. 31, 2021 to Mathematics vol. 9, p. 746 (2021), retrieved Jul. 28, 2025. (Year: 2021).*

Select Statistical Consultants, "CHAID—Chi Square Automatic Interaction Detector", published on Dec. 12, 2017 to https://select-statistics.co.uk/blog/chaid-chi-square-automatic-interaction-detector, retrieved Jul. 28, 2025. (Year: 2017).*

Omar F. Althuwaynee, etc. "A novel ensemble decision tree-based Chi-squared Automatic Interaction Detection (CHAID) and multivariate logistic regression models in landslide susceptibility mapping", published to Landslides, vol. 11, pp. 1063-1078 (2014), retrieved Jul. 28, 2025. (Year: 2014).*

Mousumi Banerjee, etc., "Tree-Based Analysis: A Practical Approach to Create Clinical Decision Making Tools", published to Circ Cardiovasc Qual Outcomes, May 2019, retrieved Jul. 28, 2025. (Year: 2019).*

Hongwen Zheng, etc., "Feature selection for high dimensional data in astronomy", published to arXiv as of Sep. 3, 2007, retrieved Jul. 28, 2025. (Year: 2007).*

Katarzyna Bijak, etc., "Does segmentation always improve model performance in credit scoring?", published via Expert Systems with Applications, vol. 39, pp. 2433-2442 (2012), retrieved Jul. 28, 2025. (Year: 2012).*

Reardon, et al., "Proactive Discovery of Insider Threats Using Graph Analysis and Learning (PRODIGAL) Final Report", DARPA Anomaly Detection at Multiple Scales (ADAMS), Reporting Period: May 2011-Nov. 2016, 131 pages.

Arnaldo, I., et al., "eX2: a framework for interactive anomaly detection", IUI Workshops'19, Mar. 20, 2019, 5 pages, Los Angeles, CA.

Li, Y., et al., "A Graph-Based Method for Active Outlier Detection With Limited Expert Feedback", Digital Object Identifier, Oct. 16, 2019, vol. 7, pp. 152267-152277.

Dosterlinck, D., et al., "From One-Class to Two-Class Classification by Incorporating Expert Knowledge: Novelty Detection in Human Behaviour", European Journal of Operational Research, Elsevier, Oct. 2019, 38 pages, vol. 282(3).

Wagstaff, K. L., et al., "Guiding Scientific Discovery with Explanations using DEMUD", Association for the Advancement of Artificial Intelligence, 2013, 7 pages.

Jaaskela, J., "Anomaly-Based Insider Threat Detection with expert Feedback and Descriptions" Master's Thesis Degree Programme in Computer Science and Engineering, Mar. 2020, 56 pages.

Hernandez-Orallo, "Soft (Gaussian CDE) regression models and loss functions." arXiv preprint arXiv:1211.1043 (2012), 51 pages.

* cited by examiner

| Entity ID | Top 1 feature | Top 2 feature | Top 3 feature | ... | Top n feature |
|---|---|---|---|---|---|
| A | F1 | F2 | F3 | ... | F5 |
| B | F1 | F5 | F3 | ... | F7 |
| C | F2 | F4 | F6 | ... | F1 |
| D | F1 | F3 | F2 | ... | F8 |
| E | F3 | F5 | F1 | ... | F6 |
| F | F4 | F2 | F6 | ... | F10 |
| G | F1 | F3 | F5 | ... | F9 |
| H | F3 | F2 | F1 | ... | F7 |
| I | F2 | F3 | F4 | ... | F5 |
| J | F2 | F1 | F3 | ... | F8 |
| K | F2 | F4 | F3 | ... | F10 |

| Entity ID | Top 1 feature | Top 2 feature | Top 3 feature |
|---|---|---|---|
| A | F1 | F2 | F3 |
| B | F1 | F5 | F3 |
| C | F2 | F4 | F6 |
| D | F1 | F3 | F2 |
| E | F3 | F5 | F1 |
| F | F4 | F2 | F6 |
| G | F1 | F3 | F5 |
| H | F3 | F2 | F1 |
| I | F2 | F3 | F4 |
| J | F2 | F1 | F3 |
| K | F2 | F4 | F3 |

Fig. 6

| Entity ID | Top 1 feature | Top 2 feature | Top 3 feature |
|---|---|---|---|
| A | F1 | F2 | F3 |
| D | F1 | F3 | F2 |
| H | F3 | F2 | F1 |
| J | F2 | F1 | F3 |

| | | | |
|---|---|---|---|
| B | F1 | F5 | F3 |
| E | F3 | F5 | F1 |
| G | F1 | F3 | F5 |

| | | | |
|---|---|---|---|
| C | F2 | F4 | F6 |
| F | F4 | F2 | F6 |

| | | | |
|---|---|---|---|
| I | F2 | F3 | F4 |
| K | F2 | F4 | F3 |

Fig. 7

| Group ID | Entity | Feature |
|---|---|---|
| 1 | A, D, H, J | F1, F2, F3 |
| 2 | B, E, G, | F1, F3, F5 |
| 3 | C, F | F2, F4, F6 |
| 4 | I, K | F2, F3, F4 |

| Pattern | Feature-based insight | Decision |
|---|---|---|
| #1 | If F1 <= 0.00328 and F2 > 0.75 and F3 > 0.75 | FP (100% of FP; 0% of TP) |
| #5 | If F1 <= 0.00328 and F2 > 0.75 and F3 <=0.75 | FP (98.8% of FP; 1.2% of TP) |

Fig. 10

| Pattern | Feature-Based Insight | Decision | Business-Oriented Insight |
|---|---|---|---|
| #1 | F1 <= 0.00328 and F2 > 0.75 and F3 > 0.75 | 100% FP | The probability of TP for the corresponding transaction type peer group is low and the Watchlist entity type is Vessel and the matched name in transaction message is found only in the ACCOUNT WITH tag. |
| #2 | F4 = "I" and F5 = 1 and F6 = 1 | 100% FP | Watchlist entity type is individual but the matched name in the transaction message is found only in bank related tag |
| #3 | F4 = "I" and F6 = 1 and F8 = "address" | 100% FP | Watchlist entity type is individual and the matched name in the transaction message is found in the ORDERING CUSTOMER tag, but in the address line |
| #4 | F3 <= 0.75 and F7 = "partial match" | 99.9% FP | Watchlist name and matched name in transaction have exactly the same characters but some in different position, resulting in different spelling |

Fig. 11

SYSTEM AND METHOD TO GENERATE INSIGHT TEMPLATES FOR RISK PROBABILITY ANALYSIS

BACKGROUND

The present application relates generally to information handling and/or data processing and analytics, and more particularly to generating insight templates, more specifically generating composite insight templates preferably generated via a feedback mechanism.

Data analytics have shown promising results in helping financial institutions across different segments to perform risk assessment, including for example suspicious activity detection. Generally, in risk assessment, probability analysis, suspicious activity detection, and/or anti-money laundering (AML) cases there are numerous and different parameters, factors, and metrics in large data sets that are analyzed and used to build advanced data analytical and/or machine learning (ML) models. Advanced machine learning (ML) models have shown promising results in prioritizing suspicious activity alerts through generating probabilistic scores. Investigating for suspicious activity, e.g., fraud, by analysts requires proper supporting evidence and extracting fraud patterns and insights our of machine learning (ML) models can be challenging. Running machine learning (ML) models and extracting insights and/or patterns can depend heavily on the features input to the machine learning (ML) models. The features input and machine learning models can sometimes result in false positive (fp) insights. Subject matter feedback can be important in recognizing and eliminating these false positive (fp) insights. It would be advantageous to have a system, platform, and/or method to enable the generation of clearly explainable insights to recognize and alleviate and/or reduce false positives (fp).

SUMMARY

The summary of the disclosure is given to aid understanding of, and not with an intent to limit the disclosure. The present disclosure is directed to a person of ordinary skill in the art. It should be understood that various aspects and features of the disclosure may advantageously be used separately in some circumstances or instances, or in combination with other aspects, embodiments, and/or features of the disclosure in other circumstances or instances. Accordingly, variations and modifications may be made to the system, method, and/or computer program product to achieve different effects. In this regard, it will be appreciated that the disclosure presents and describes one or more inventions, and in aspects includes numerous inventions as defined by the claims.

A system, platform, computer program product, and/or method is disclosed according to one or more embodiments for providing and/or generating insight templates preferably to more clearly explain insights uncovered by machine learning (ML) models. In an aspect, composite insight templates and/or insights are preferably generated through a feedback mechanism. In an approach, machine learning (ML) features-oriented explainability is combined with subject matter expert knowledge to generate, create, and/or establish business-oriented insights. In an aspect, distinct, composite insight templates can be built and/or generated with subject matter knowledge to transform machine learning (ML) results into actionable insights. Business-oriented insights can be incorporated as feedback to provide improved machine learning results and reduce investigation time.

In one or more embodiments a system, platform, computer program product and/or computer-implemented method for generating new composite insight templates for explaining the results of one or more machine learning data analytic models is disclosed including: running one or more machine learning data analytic models on a data set to obtain for each of a plurality of entities, a risk score and feature-based insights supporting the risk score for said entity; generating a list of top "n" features input to the one or more machine learning data analytic models that contribute to the risk score for each entity; grouping entities based upon similar features input to the one or more machine learning data analytic models that contribute to the risk score for each entity; generating a decision tree for at least one of the group of entities; extracting, from the decision tree generated for the at least one of the group of entities, one or more feature-based insights; generating, by applying subject matter input, a new composite insight based upon the one or more feature-based insights extracted from the decision tree; and adding the new composite insight to insight templates. The system, platform, computer program product, and/or computer-implemented method in an approach further including: creating a composite feature as a new input feature to the one or more machine learning data analytic models and/or tracking the new composite insights. The top "n" features that contribute to the risk score for each entity in an aspect is generated by an explainability tool and in an embodiment the top "n" features that contribute to the risk score for each entity is larger than a number "x" of similar features that contribute to the risk score for each entity.

Grouping entities based upon similar features that contribute to the risk score for each entity in one or more embodiments includes: listing, by entity identification, the top "x" features that contribute to the risk score for that entity; grouping, by entity identification, the same set of "x" features that contribute to the risk score; and identifying each grouping having the same set of "x" features that contribute to the risk score. Generating a decision tree for at least one of the group of entities further includes, according to one or more approaches, generating the decision tree for the at least one of the group of entities based upon a top "x" of similar features that contribute to the risk score for that group. The top "x" of similar features according to an embodiment is the top 3 features that contribute to the risk score for each entity in that group. In a further aspect, applying subject matter input comprises a user applying subject matter knowledge to interpret the one or more feature-based insights extracted from the decision tree. Creating a composite feature as new input feature in a further embodiment includes: determining one or more patterns to use to create one or more composite features; create a composite feature based upon each determined pattern; and add as a new feature input for the machine learning data analytics models at least one of the composite features.

The computer program product in one or more embodiments can include instructions that are embedded on and/or stored in a non-transitory computer readable medium that, when executed by at least one hardware processor, configure the at least one hardware processor to perform the operations specified above and discussed in this disclosure. The system according to an aspect can include a memory storage device storing program instructions; and a hardware processor coupled to said memory storage device, the hardware processor, in response to executing said program instructions, is configured to perform the operations specified above and discussed in this disclosure.

The foregoing and other objects, features, and/or advantages of the invention will be apparent from the following more particular descriptions and exemplary embodiments of the invention as illustrated in the accompanying drawings.

BRIEF DESCRIPTION OF THE DRAWINGS

The various aspects, approaches, and/or embodiments of a computer implemented system, platform, computer program product and/or method to generate insight templates that preferably provide subject matter knowledge preferably to reduce risk probability investigation time, including preferably transforming machine learning results into actionable insights, will be better understood when read in conjunction with the figures provided. A numbered element is typically numbered according to the figure in which the element is introduced, and is typically referred to by that number throughout succeeding figures, and like reference numbers generally represent like parts of the illustrative embodiments of the invention. Embodiments are provided in the figures for the purpose of illustrating aspects, features, and/or various embodiments of the systems and methods, but the claims should not be limited to the precise arrangement, structures, features, aspects, systems, modules, functional units, circuitry, embodiments, methods, processes, techniques, instructions, programming, and/or devices shown, and the arrangements, structures, features, aspects, systems, modules, functional units, circuitry, embodiments, methods, processes, techniques, instructions, programming, and devices shown may be used singularly or in combination with other arrangements, structures, systems, modules, functional units, features, aspects, circuitry, embodiments, methods, techniques, processes, instructions, programming, and/or devices.

FIG. 6 discloses a table or list that shows the top three features contributing to a probability risk score by entity according to an embodiment of the present disclosure;

FIG. 7 illustrates a block diagram showing tables that group entities by the top similar features that contribute to the probability risk score according to an embodiment of the present disclosure;

FIG. 10 illustrates an example of extracting a feature-based insight from the decision tree according to an embodiment of the disclosure;

FIG. 11 illustrates an example of generating a composite (e.g., a subject matter-oriented) insight according to an embodiment of the disclosure;

DETAILED DESCRIPTION

The following description is made for illustrating the general principles of the invention and is not meant to limit the inventive concepts claimed herein. In the following detailed description, numerous details are set forth in order to provide an understanding of the system, platform, computer program product, method, and/or techniques for generating insight templates that preferably provide subject matter expertise, e.g., a subject matter or business-based insight. It will be understood, however, by those skilled in the art that different and numerous embodiments of the system and its method of operation may be practiced without the specific details, and the claims and disclosure should not be limited to the arrangements, structures, systems, modules, functional units, circuitry, embodiments, features, aspects, processes, methods, techniques, instructions, programming, and/or details specifically described and shown herein. Further, particular features, aspects, arrangements, structures, systems, modules, functional units, circuitry, embodiments, methods, processes, techniques, instructions, programming, details, etc. described herein can be used in combination with other described features, aspects, arrangements, structures, systems, modules, functional units, circuitry, embodiments, techniques, methods, processes, instructions, programming, details, etc. in each of the various possible combinations and permutations.

The following discussion omits or only briefly describes conventional features of information processing systems and data networks, including electronic advanced data analytics programs or electronic risk assessment or probability tools configured and adapted for example to detect suspicious activity and/or problematic transactions in connection with, for example, financial transactions and/or insurance claim transactions, which should be apparent to those skilled in the art. It is assumed that those skilled in the art are familiar with data processing including large scale data processing (also referred to as information/data processing systems) and their operation, and implementation and application of advanced data analytics, including data analytics systems and processes using, for example, machine learning (ML) models.

Figure 1:
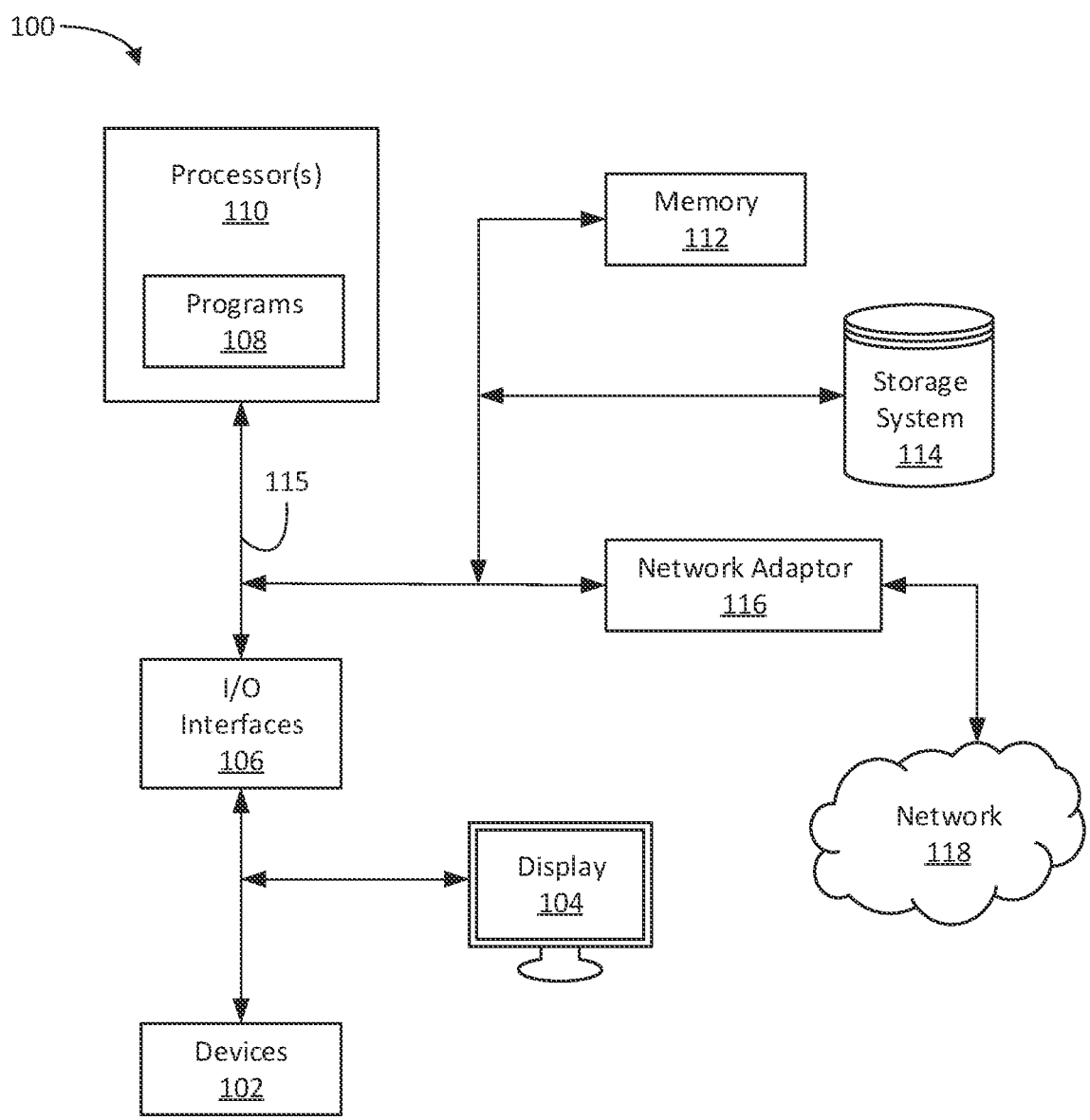
FIG. 1 schematically illustrates an exemplary computer system in accordance with the present disclosure to generate insight templates that in an embodiment incorporate subject matter knowledge.

FIG. 1 illustrates an example computing and/or data processing system 100 in which aspects of the present disclosure may be practiced. It is to be understood that the computer and/or data processing system 100 depicted is only one example of a suitable processing system and is not intended to suggest any limitation as to the scope of use or functionality of embodiments of the present invention. For example, the system shown may be operational with numerous other special-purpose computing system environments or configurations. Examples of well-known computing systems, environments, and/or configurations that may be suitable for use with the system shown in FIG. 1 may include, but are not limited to, server computer systems, mainframe computers, distributed cloud computer systems, personal computer (PC) systems, PC networks, thin clients, thick clients, minicomputer systems, handheld or laptop devices, multiprocessor systems, microprocessor-based systems, smart phone, set top boxes, programmable consumer electronics, and the like that include any of the above systems or devices, and the like.

In some embodiments, the computer system 100 may be described in the general context of computer system executable instructions, embodied as program modules stored in memory 112, being executed by the computer system. Generally, program modules may include routines, programs, objects, components, logic, data structures, and so on that perform particular tasks and/or implement particular input data and/or data types in accordance with the present invention.

The components of the computer system 100 may include, but are not limited to, one or more processors or processing units 110, a memory 112, and a bus 115 that operably couples various system components, including memory 112 to processor 110. In some embodiments, the processor 110, which is also referred to as a central processing unit (CPU) or microprocessor, may execute one or more programs or modules 108 that are loaded from memory 112 to local memory, where the program module(s) embody software (program instructions) that cause the processor to perform one or more operations. In some embodiments, module 108 may be programmed into the integrated circuits of the processor 110, loaded from memory 112, storage device 114, network 118 and/or combinations thereof to local memory.

The processor (or CPU) 110 can include various functional units, registers, buffers, execution units, caches, memories, and other units formed by integrated circuitry, and may operate according to reduced instruction set computing ("RISC") techniques. The processor 110 processes data according to processor cycles, synchronized, in some aspects, to an internal clock (not shown). Bus 115 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. The computer system may include a variety of computer system readable media, including non-transitory readable media. Such media may be any available media that is accessible by the computer system, and it may include both volatile and non-volatile media, removable and non-removable media.

Memory 112 (sometimes referred to as system memory) can include computer readable media in the form of volatile memory, such as random-access memory (RAM), cache memory and/or other forms. Computer system may further include other removable/non-removable, volatile/non-volatile computer system storage media. By way of example only, storage system 114 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 115 by one or more data media interfaces.

The computer system may also communicate with one or more external devices 102 such as a keyboard, track ball, mouse, microphone, speaker, a pointing device, a display 104, etc.; one or more devices that enable a user to interact with the computer system; and/or any devices (e.g., network card, modem, etc.) that enable the computer system to communicate with one or more other computing devices. Such communication can occur via Input/Output (I/O) interfaces 106. Communications or network adapter 116 interconnects bus 115 with an outside network 118 enabling the data processing system 100 to communicate with other such systems. Additionally, an operating system such as, for example, AIX ("AIX" is a trademark of the IBM Corporation) is used to coordinate the functions of the various components shown in FIG. 1.

The computer system 100 can communicate with one or more networks 118 such as a local area network (LAN), a general wide area network (WAN), and/or a public network (e.g., the Internet) via network adapter 116. As depicted, network adapter 118 communicates with the other components of computer system via bus 115. It should be understood that although not shown, other hardware and/or software components could be used in conjunction with the computer system. Examples include, but are not limited to: microcode, device drivers, redundant processing units, external disk-drive arrays, RAID systems, tape drives, and data archival storage systems, etc.

Figure 2:
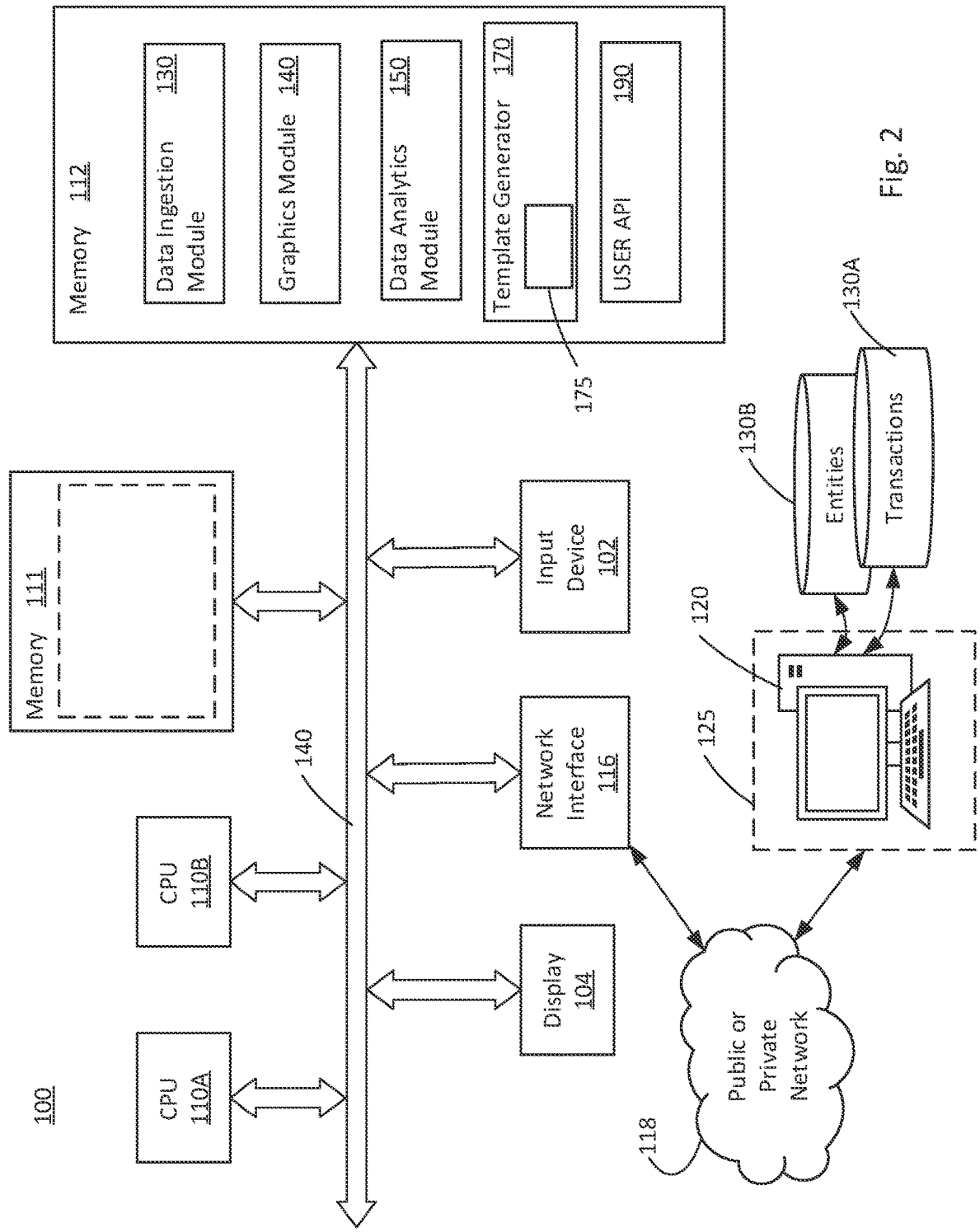
FIG. 2 schematically illustrates an exemplary computer system/computing device which is applicable to implement one or more embodiments of the present disclosure to generate insight templates that in a preferred embodiment incorporate subject matter expertise and knowledge.

FIG. 2 illustrates a computer system 100 configured and programmed to evaluate and analyze data through use of for example advanced data analytics, for example, for use in detecting suspicious, problematic, risky, and/or fraudulent transactions in the domain of financial services, insurance claims processing, and related industries, e.g., transaction risk assessment, loan/mortgage processing, insurance claim fraud, money laundering, and/or fraud detection. In embodiments, such a system 100 may be employed by or for a financial institution or insurance company. According to an embodiment, system 100 is a computer system, a computing device, a mobile device, or a server configured to run risk assessment, fraudulent detection, money laundering, and/or other software applications and models. In some aspects, computer system/device 100 can include, for example, mainframe computers, servers, distributed cloud computing environments, thin clients, thick clients, personal computers, PC networks, laptops, tablets, mini-computers, multi-processor based systems, micro-processor based systems, smart devices, smart phones, set-top boxes, programmable electronics, or any other similar computing device, an embodiment of which is described in more detail in FIG. 1.

Computing system 100 includes one or more hardware processors 110A, 110B (also referred to as central processing units (CPUs)), a memory 112, e.g., for storing an operating system, application program interfaces (APIs) and programs, a network interface 116, a display device 104, an input device 102, and any other features common to a computing device. Further, as part of system 100, there is provided a local memory 111 and/or an attached memory storage device (not shown).

In some aspects, computing system or platform 100 may, for example, be any computing device that is configured to communicate with one or more web-sites 125 including a web-based or cloud-based server 120 over a public or private communications network 118. For instance, a website may include a financial institution that records/stores information, e.g., multiple financial transactions occurring between numerous parties (entities), loan processing, insurance claim processing and/or electronic transactions. Such transactions, e.g., loan processing, insurance claim processing, and/or electronic financial transactions, may be stored in a database 130A with associated entity information stored in related database 130B.

In the embodiment depicted in FIG. 2, processors 110A, 110B may include, for example, a microcontroller, Field Programmable Gate Array (FPGA), or any other processor that is configurable to perform operations according to instructions in software programs as described below. These instructions may be stored, for example, as programmed modules in memory storage device 112. Communication channels 140, e.g., wired connections such as data bus lines, address bus lines, Input/Output (I/O) data lines, video bus, expansion busses, etc., are shown for routing signals between the various components of system 100.

Network interface 116 is configured to transmit and receive data or information to and from a web-site server 120, e.g., via wired or wireless connections. For example, network interface 116 may utilize wireless technologies and communication protocols such as Bluetooth®, WIFI (e.g., 802.11a/b/g/n), cellular networks (e.g., CDMA, GSM, M2M, and 3G/4G/4G LTE, 5G), near-field communications systems, satellite communications, via a local area network (LAN), via a wide area network (WAN), or any other form of communication that allows computing device 100 to transmit information to or receive information from the server 120.

Display 104 may include, for example, a computer monitor, television, smart television, a display screen integrated into a personal computing device such as, for example, laptops, smart phones, smart watches, virtual reality headsets, smart wearable devices, or any other mechanism for displaying information to a user. In some aspects, display 104 may include a liquid crystal display (LCD), an e-paper/e-ink display, an organic LED (OLED) display, or other similar display technologies. In some aspects, display 104 may be touch-sensitive and may also function as an input device.

Input device 102 may include, for example, a keyboard, a mouse, a touch-sensitive display, a keypad, a microphone, a camera, or other similar input devices or any other input devices that may be used alone or together to provide a user with the capability to interact with the computing device 100.

Memory 112 may include, for example, non-transitory computer readable media in the form of volatile memory, such as random-access memory (RAM) and/or cache memory or others. Memory 112 may include, for example, other removable/non-removable, volatile/non-volatile storage media. By way of non-limiting examples only, memory 112 may include a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Memory 112 of computer system 100 stores one or more modules that include, for example, programmed instructions adapted to evaluate data using data analytics, generating insights, performing risk assessment, anti-money laundering (AML), and/or suspicious activity detection, and/or generating alerts and/or reports. In one embodiment, one of the programmed processing modules stored at the associated memory 112 includes a data ingestion module 130 that provide instructions and logic for operating circuitry to access/read large amounts of data (e.g., parties, accounts, transactions, claims, events, etc.) for use by other modules that process and analyze the data to provide insights and provide risk assessment, AML, and/or detect suspicious activity, using for example machine learning models.

In one or more embodiments, the input data for data ingestion module 130 comprises parties, accounts, transactions, claims, events, payment history, etc. For example, where a financial institution, such as for example a bank, desires to determine if there is a transaction risk or determine the risk of a money laundering scheme or other suspicious activity indicative of for example fraud, the input data can comprise: the transactions occurring with or being processed by the financial institution; the parties to any financial transaction with or through the financial institution; account information (the customers) of the financial institution, the present status or state of any financial transaction, etc. In the case of an insurance organization and the like, the input data can comprise: the parties doing business with the insurance organization; the claims made with the insurance organization; policy information; the status of the current claim; the identity of any agencies or brokers that were involved in underwriting the policy; and/or any parties involved in treating the claim, e.g., auto body shop fixing the motor vehicle, physician treating patient, etc. The examples above are not limiting and there can be other situations where the system will have application, and additional or other input data can be provided.

System 100 in an aspect further contains Graphics Module 140 in memory 112 that in an embodiment contains one or more graphics programs that provides instructions and logic for operating circuits to access, read, generate and/or build one or more graphs, charts and other visual aids to facilitate monitoring and tracking the condition of the data, e.g., monitor and/or track the probability risk score. While the Graphics Module 140 is shown as being a separate module in memory 112, it can be appreciated that the Graphics Module 140 can be integrated into one or more modules in memory 112, and/or a module within Data Analytics Module 150.

In one or more embodiments, system or platform 100, e.g., memory 112, contains a Data Analytics Module 150 that contains one or more data analytics modules and/or software programs that provides instructions and logic for operating circuits to analyze data. The data analytics modules and/or programs in Data Analytics Module 150 can include, for example, Entity Resolution, Clustering, Supervised ML, Anomaly, Graph Analytic, and/or Counter Party to name a few. Entity Resolution clarifies records and removes ambiguity associated with entity identification. Clustering assigns parties to homogeneous groupings. Supervised ML calculates risk associated with each party based upon historical data. Anomaly identifies potential abnormal pattern through peer similarity. Graph Analytic evaluates risk through network structure and Counter Party analyzes the relationship and impact between party and counter party.

The data analytics modules can be used to, for example, assess risk, AML, and/or suspicious activity detection. The data analytics modules and/or programs 150, in one or more embodiments, leverage cognitive capabilities. A cognitive system (sometimes referred to as deep learning, deep thought, or deep question answering) is a form of artificial intelligence (AI) that uses machine learning and problem solving. A modern implementation of artificial intelligence (AI) is the IBM Watson cognitive technology. Models for scoring and ranking an answer can be trained on the basis of large sets of input data. The more algorithms that find the same answer independently, the more likely that answer is correct, resulting in an overall score or confidence level. Cognitive systems are generally known in the art.

Data Analytic Module 150 for example can include a probabilistic risk model to determine a transaction risk probability based on the variables or features of the transaction and metadata. Module 150 can invoke a ML Model to perform supervised (or unsupervised) machine learning techniques for detecting business risk (including detecting suspicious activity indicative of criminal activity, e.g., fraud), as known in the art, e.g., supervised learning using a regression model to predict a value of input data (classification) and unsupervised learning (clustering) techniques. Based on features and metadata, techniques employing Hidden Markov Models or Artificial Neural Networks may alternatively or additionally be employed to compute a risk associated with the particular party/transaction. The result of the machine learning model in an embodiment can be the computing of a risk "weight" or score attributed to the particular party (e.g., entity) or transaction.

Data Analytic Module 150 can also include a Risk-by-Association analyzer employing logic and instructions for performing a Risk-by-Association analysis based upon associations found in the data. For example, in the context of financial suspicious activity detection, the Risk-by-Association analysis performed is used to establish "suspicion" of an entity based on "associations" or "patterns" in the data. Such analysis methods can employ one or more risk-by-association machine learned methods and/or models: Random Walk with Restarts (RW), Semi-Supervised Learning (SSL), and Belief Propagation (BP), as known in the art. Such risk-by-association method(s) and/or model(s) results in computing a risk-by-association score. Based on the computed Risk-by-Association analysis score, an alert and/or suspicious activity report (SAR) can be produced, and an analyst can analyze the alert and/or SARs and provide feedback as to a potential risk level of a party and/or transaction.

Data Analytic Module 150 can also include a pattern determination/detection module employing instructions and logic for operating circuits to detect any data patterns indicative of risk and/or suspicious activity in a transaction. The pattern detection module in an embodiment reads data and detects patterns of behavior or activity. The pattern detection module implements instructions and logic for operating circuits to receive input configuration data, receive training data, historic data, current data, and/or actual live data to detect data patterns. In one or more embodiments the pattern determination module leverages cognitive capabilities. Several data analytics modules and programs have been described, however, other data analytics programs, models and/or modules are contemplated as included within system 100, e.g., in memory 112.

Memory 112 further includes Template Generator 170 that in an embodiment contains one or more programs that provide instructions and logic for operating circuits to generate templates to explain insights, preferably insights that provide subject matter expertise, as will be explained in more detail.

System or platform 100 optionally includes a supervisory program having instructions and logic for configuring the computing system 100 to call one or more, and in an embodiment all, of the program modules and invoke the operations of system 100. In an embodiment, such supervisory program calls methods and provides application program interfaces for running the Graphics Module 140, Data Analytics Module 150, and/or Template Generator 170. At least one application program interface 190 is invoked in an embodiment to receive input data from a "user". Via API 190, the user can control the operation and/or configuration of the system or platform 100 and can input data, data files, and/or data sets into system 100. The system 100 in an embodiment produces and/or generates one or more insights, alerts, and/or results which can be reviewed by the user, including a subject matter expert.

Advanced Machine Learning has shown promising results in prioritizing suspicious alerts through generating probabilistic risk scores. Investigation for suspicious activities requires proper supporting evidence. Extracting patterns and insights indicative of suspicious activity (e.g., fraud) from Machine Learning, however, can be challenging. Identifying patterns indicative of suspicious activity and extracting insights can depend heavily on the features input, and may not be business driven or oriented. Subject matter expert feedback is important and valuable in the investigation process.

Disclosed is a system, platform, computer program product, and/or method in one or more aspects to enable the generation of clearly explainable insights, preferably clearly explainable business insights. In one or more embodiments a feedback loop and/or mechanism is provided to create and/or generate advanced insight templates, preferably adding insight patterns to clearly explainable insights. In one or more aspects, machine-learning features-oriented explainability is combined with subject matter expertise and knowledge to establish business-oriented insights. In one or more approaches, the system, platform, computer program product and/or method incorporates business-oriented insights as feedback to improve the suspicious activity investigation. In one or more embodiments, distinct and relevant insight templates are generated, built, and/or created with subject matter knowledge that transforms the machine learning results into better and more actionable insights. In one or more approaches, a system, platform, computer program product, and/or method that enables the generation of clearly explainable insights through a feedback mechanism or feedback loop is provided Advantageously the coverage of clearly explainable results are increased and the time investigating the suspicious activity is reduced.

An example of clearly explainable insights can be where a transaction message states, "New supply guru, 100 Cuba Ave, 10306-1111 Staten Island, United States" triggers the generation of an explainable insight—"the watchlist entity is the country Cuba, but the match is on the street name '100 Cuba Ave.'". In a further example, there is a transaction message that states, "Bang Tui Trading, KM 50 West Service Road, Canumay, North Valenzuela City, Philippines" and triggers the generation of explainable insight—"the watchlist entity is the individual Wea Bang Tun, but the match is on the company Bang Tui Trading." Another example is the transaction message "/ACC/IFO, Yuanchong BR., China, SWIFT: ABCDEFG" which generates the message "the watchlist entity is the individual Chong Yuan, but the match is on a bank related field Yuanchong B., China." In each of these examples, the transaction message typically is flagged for review and creates a false positive (fp), and in this instance the transaction generates an explainable insight that provides further detail on the transaction and explains the insight and results.

Figure 3:
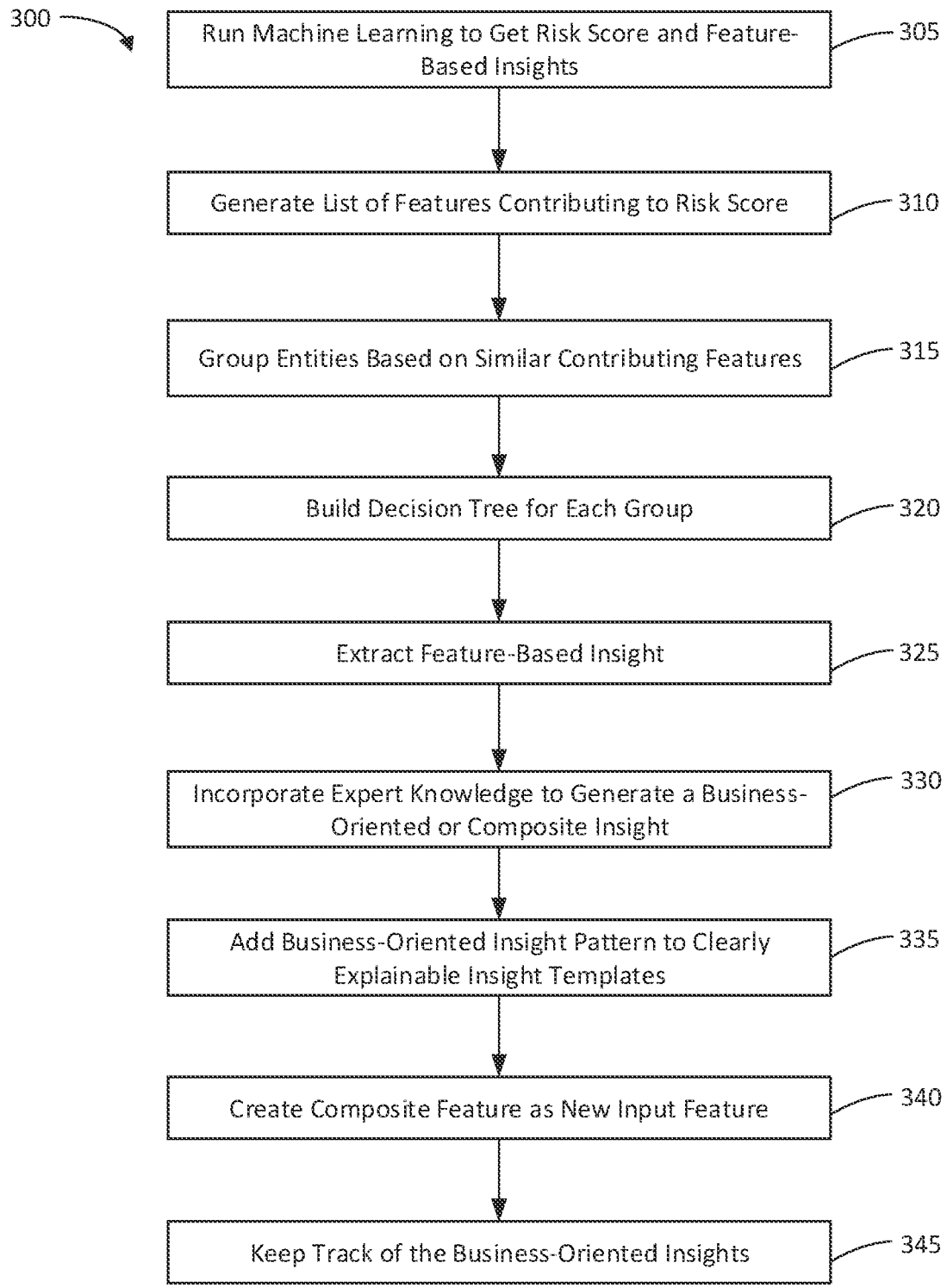
FIG. 3 illustrates a diagrammatic flowchart of a method according to an embodiment of the present disclosure of generating insight templates that preferably incorporate subject matter expertise and knowledge.

FIG. 3 is an exemplary flowchart in accordance with an embodiment illustrating and describing a method 300 of generating insight templates to explain insights generated by the machine-learning (ML) programs and/or models, and in an approach creating composite features and tracking the composite features and/or insights. While the method 300 is described for the sake of convenience and not with an intent of limiting the disclosure as comprising a series and/or a number of steps, it is to be understood that the process 300 does not need to be performed as a series of steps and/or the steps do not need to be performed in the order shown and described with respect to FIG. 3, but the process 300 may be integrated and/or one or more steps may be performed together, simultaneously, or the steps may be performed in the order disclosed or in an alternate order.

In one or more embodiments, the machine learning (ML) program(s) and/or model(s) is run to get a risk score for each entity at 305. Feature based insights for each entity are also generated at 305. In machine-learning and pattern recognition, a feature is an individual measurable property or piece of data that act as inputs into the program and/or model. For example, the number of transactions conducted by an entity, the age of the entity, the sex of the entity, the type of entity (e.g., corporation, individual, etc.), the address of the entity, the country of the entity, etc. are all examples of features. The purpose of insights is to provide supporting evidence as to why the model is making a specific prediction. The machine learning programs and/or models typically receive features as input and generate or output insights based upon the features inputted into the program and/or model. The insights generated by the machine learning programs are based upon one or more of the features, and can be referred to as feature-based insights. In feature-based insights, the features are a source of the supporting evidence. In an approach, at 305, the machine learning program and/or model generates for each entity, insights based upon one or more features input into the machine learning program and/or model.

Figures 4, 5:
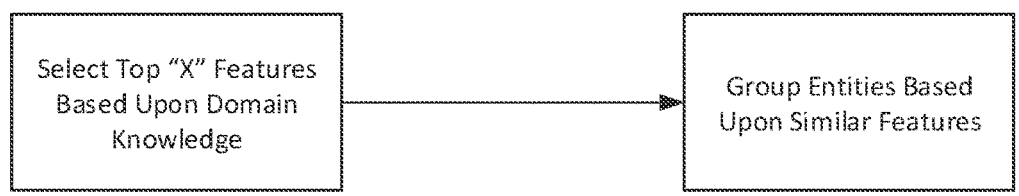
FIG. 4 illustrates a diagrammatic block diagram or table that by entity ranks the top "n" features contributing to a probability risk score according to an embodiment of the present disclosure.
FIG. 5 illustrates a diagrammatic block diagram of a process of grouping entities based upon similar features according to an embodiment of the present disclosure.

At 310, for each entity a list of features that contribute to the risk score is generated. In an embodiment, the list of features generated at 310 is usually ranked by listing the top features that contribute to the risk score, by listing first the feature that contributes the most to the risk score, followed by the second highest contributing feature, etc. In one or more embodiments, for each entity, the explainability tool is used to obtain the list of features (preferably the list of top features) that contribute to the risk score for that entity. The explainability tool provides analysis and understanding of the results generated by the ML model. An example of a ranked list of contributing features to a risk score is shown in FIG. 4. More specifically, in FIG. 4, for each entity (based upon e.g., entity ID), the top "n" features that contributed to the risk score are ranked. The number "n" of features can be fixed, predetermined, predefined, adjustable, and/or programable. The number "n" features selected to obtain the top contributing features can be based upon domain knowledge and/or to capture a percentage (e.g., top 60%) of the contributing features to the risk score, as some examples of selecting the top "n" contributing features.

Figures 8, 9:
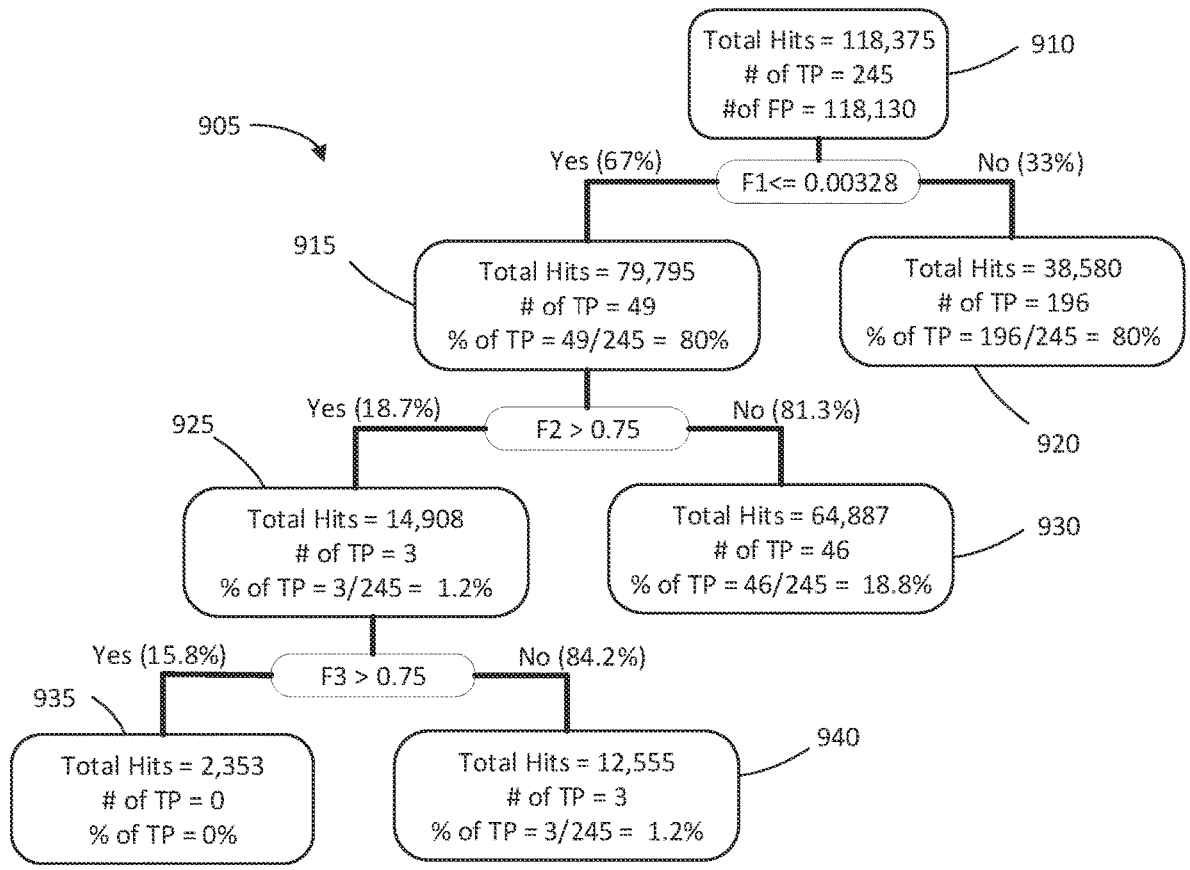
FIG. 8 illustrates a table showing groupings of entities based upon the top similar features contributing to the probability risk score according to an embodiment of the present disclosure.
FIG. 9 illustrates a decision tree built for each grouping based upon the top "n" contributing features to the probability score according to an embodiment of the present disclosure.

Entities at 315 are grouped based upon similar contributing features. In one or more embodiments, the entities at 315 are grouped based upon the top "X" similar contributing features. In one or more embodiments, a process according to 315 of grouping the entities based upon similar contributing features is shown in FIG. 5 where the top "X" features are selected based upon for example domain knowledge, and then the entities are grouped according to and/or based upon having similar features. The top "X" features selected at 315 are generally less than the top "n" features selected at 310. FIGS. 6-8 show a further example of the process at 315 of grouping based upon the top contributing features being similar. In FIG. 6, for each entity the top "3" features for each entity that contribute to the risk score are identified. Each entity having the same top 3 features are grouped in FIG. 7. Note that the groupings in FIG. 7 do not require the top 3 features to be ranked in the same order. As shown in FIG. 7 each of entities A, D, H, and J have features F1, F2, and F3 that were the top 3 contributing features to their risk score, while each of entities B, E, and G had features F1, F3, and F5 as their top 3 contributing features. FIG. 8 shows the four groups that have similar top 3 contributing features to their risk score where each group is provided a group identification (Group ID #) and lists the entities that have the same top 3 contributing features, and lists (e.g., identifies) those top 3 contributing features. In the example of FIGS. 6-8 "similar" has been defined as having the same set of features, but it can be appreciated that different groupings can be provided and similar can take on a different definition.

At 320 a decision tree for each group is built for validation of the risk score results. The decision tree determines the patterns and provides information on what patterns are providing the false positives (FP). In one or more embodiments, only the top "X" features that contribute to the risk score are used for grouping the entities are used for building the decision tree. FIG. 9 illustrates a decision tree 905 built, for example using CHAID, based on the top three features (F1, F2, and F3). CHAID, which stands for Chi-Square Automatic Interaction Detector, is a tool used to discover the relationship between variables. CHAID analysis builds a predictive model, or tree, to help determine how variables best merge to explain the outcome in the given dependent variable. At block 910 there is 118,375 total hits of which 245 are true positives (TP) and 118,130 are false positives (FP). At the first branch if F1 (Feature 1 of the group)<=to 0.00328 (which happens 67% of the time (79,795/118,375)), then the decision tree 905 goes to block 915 where there are 49 out 245 (20%) true positives (TP); or if F1>0.00328 (which happens 33% of the time (38,580/118,375)), then the decision tree 905 goes to block 920 where there are 196 out of 245 (80%) true positives (TP). Continuing down the Yes branch, if F2 (Feature 2 of the group)>0.75 (which happens 18.7% of the time (14,908/79,795)), then the decision tree 905 goes to block 925 where the number of true positives (TP) are 3 out of 245 (1.2%); and if F2<=0.75 (which happens 81.3% of the time), then the decision tree 905 goes to block 930 where the number of true positives (TP) are 46 out of 245 (18.8%). Continuing down the Yes branch, if F3 (Feature 3 of the group)>0.75 (which happens 15.8% of the time (2,353/14,908), then the decision tree goes to block 935 where the number of true positives (TP) is 0 out of 245 (0%); and if F3<=0.75 (which happens 84.2% of the time (12,555/14,908)), then the decision tree goes to block 940 where the number of true positives (TPs) is 3 out of 245 (1.2%).

At 325 patterns (e.g., feature-based insights) are extracted from the decision tree. A decision tree is usually built to enable decision-making. There is a unique path to each terminal node and that unique path can be used to generate the rules for the decision. Each unique path defines one potential pattern. FIG. 10 illustrates patterns extracted from decision tree 905 in FIG. 9. For example, FIG. 10 shows pattern #1 extracted from decision tree 905 where pattern #1 is based upon the feature based-insight F1<=0.00328, F2>0.75, and F3>0.75 which results in a false positive (100% of False Positive (FP) and 0% true positives) as shown and extracted from block 935 in FIG. 9. FIG. 10 also shows pattern #5 extracted from decision tree 905 where pattern #5 is based upon the feature based-insight F1<=0.00328, F2>0.75, and F3<=0.75 which results in a false positive (98.8% of False Positives (FP) and 1.2% true positives (TP)) as shown and extracted from block 940 in FIG. 9.

At 330 expert knowledge is applied to generate a composite insight, preferably a business-oriented insight. In an embodiment, a user can review and/or supply expert knowledge, e.g., domain specific knowledge, while in another embodiment a program can be built using NLP technology to automatically generate composite insight, e.g., a business-oriented insight. For example, at 330 the different extracted patterns, which are based upon feature-based insights that result in false positives as shown in FIG. 10, are used to generate composite insights (e.g., business-oriented insights) as shown in FIG. 11. For example, in FIG. 11, pattern #1 (e.g., composite insight #1) based upon feature-based insights F1<=0.00328, F2>0.75, and F3>0.75 has 100% false positives (FP), and the meaning of that pattern of feature-based insights is that "the probability of true positive (TP) for the corresponding transaction type peer group is low and the Watchlist entity type is Vessel and the matched name in the transaction message is found only in the ACCOUNT WITH tag." Pattern #2 (e.g., composite insight #2) in FIG. 11 based upon feature-based insights F4="I", F5=1, and F6=1 has 100% false positives (FP) and the meaning of that pattern of feature-based insights is that the "Watchlist entity type is individual but the matched name in the transaction message is found only in bank related tag." Pattern #3 (e.g., composite insight #3) in FIG. 11 based upon feature-based insights F4="I", F6=1, and F8="address" has 100% false positives (FP) and the meaning of that pattern of feature-based insights is that the "Watchlist entity type is individual and the matched name in the transaction message is found in the ORDERING CUSTOMER tag, but in the address line." Pattern #4 (e.g., composite insight #4) in FIG. 11 based upon feature-based insights F3<=0.75 and F7="partial match" has 99.9% false positives (FP) and the meaning of that pattern of feature-based insights is that the "Watchlist name and matched name in transaction have exactly the same characters but some in different positions, resulting in a different spelling." Accordingly, different patterns based upon different insights resulting in false positive results have explainable insights as provided in FIG. 11.

Figure 12:
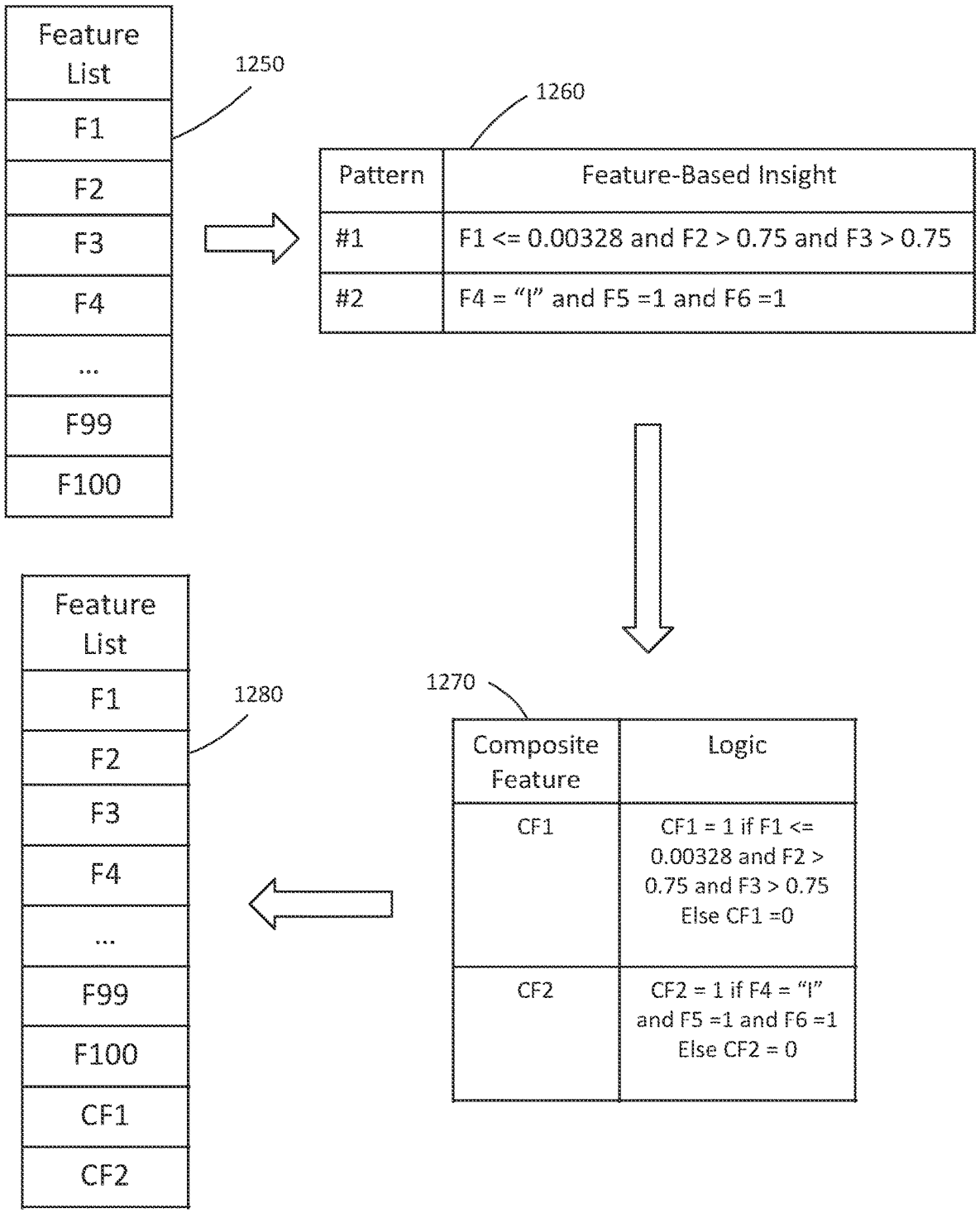
FIG. 12 illustrates an example of creating composite features according to an embodiment of the disclosure.

At 335 the newly generated composite insights, e.g., the new insight patterns, are added to the clearly explainable insight templates. That is, there is a group of insight templates that provide clear explanation as to the patterns that are generating and/or influencing the insights and/or results that are being generated, and at 335, the explanations for the new patterns extracted from the decision tree built for each group (based upon the similar contributing features) is added to the clearly explainable insight templates. The clearly explainable insights are mainly based upon business-oriented insights that in an approach are reviewed by analysts. A composite feature is created at 340 as a new input feature. That is, at 340 a new input (composite) feature is created using multiple feature-based insights. FIG. 12 illustrates the specifics according to one embodiment of the process at 340 of creating of a new input feature based upon a composite of multiple features. For example, in a machine learning model, there are typically numerous features that are input as shown by feature list 1250 in FIG. 12, e.g., 100 features F1-F100. One or more patterns are determined for use in creating the composite features as shown by table 1260. For example, in FIG. 12 at table 1260, pattern #1 can be selected based upon the composite features of F1 being<=0.00328, F2 being>0.75, and F3 being>0.75; and pattern #2 can be selected based upon the composite features of F4="I", F5=1, and F6=1. The composite feature based upon each pattern is created, established, and/or determined as shown in table 1270 in FIG. 12. In table 1270 composite feature CF1 can be based upon pattern #1 and composite feature CF2 can be based upon pattern #2. In FIG. 12 the composite features (e.g., CF1 and CF2) can be added to the feature list 1280 so now there are 102 features (as inputs for machine learning and/or data analytics modules). In one or more embodiments, the candidate feature list input to the machine learning model is enhanced through this feedback process.

Figure 13:
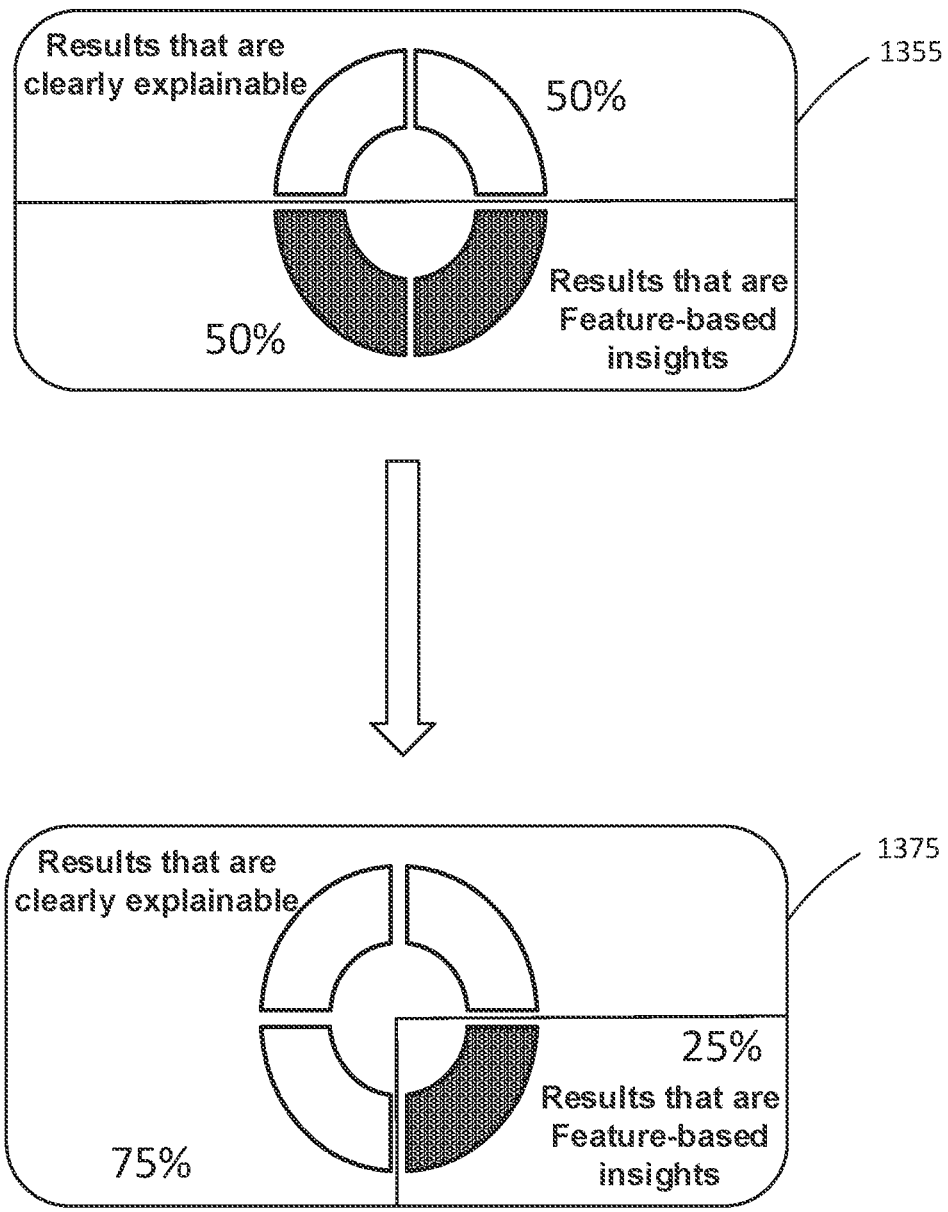
FIG. 13 illustrates an example of tracking insights, e.g., clearly explainable insights, according to an embodiment of the disclosure.

At 345 the composite features (e.g., the business-oriented insights) can be tracked. For example, the percentage that each business-oriented insight (e.g., composite feature) is used can be tracked and/or the percentage amount that the new composite features make up out of the total number of explainable insights can be tracked. For example, FIG. 13 is an illustration showing the tracking of the clearly explainable insights. In FIG. 13 at 1355 there were eight (8) different patterns and four (4) of them are clearly explainable (business) insights established previously for 50% of the clearly explainable insights; and after the process 300 there are two more clearly explainable (business) insights added to the previously established clearly explainable (business) insights, which changes the percentage of clearly explainable (business) insights from 50% to 75% of clearly explainable insights as shown at 1375.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor, functional units of a processor, or computer implemented system, and logic integrated with and/or executable by the system, processor, or functional units, the logic being configured to perform one or more of the process steps cited herein. What is meant by integrated with is that in an embodiment the functional unit or processor has logic embedded therewith as hardware logic, such as an application specific integrated circuit (ASIC), a field programmable gate array (FPGA), etc. By executable by the functional unit or processor, what is meant is that the logic in an embodiment is hardware logic; software logic such as firmware, part of an operating system, part of an application program; etc., or some combination of hardware or software logic that is accessible by the functional unit or processor and configured to cause the functional unit or processor to perform some functionality upon execution by the functional unit or processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above. If will be further appreciated that embodiments of the present invention may be provided in the form of a service deployed on behalf of a customer to offer a service on demand.

The terminology used herein is for the purpose of describing particular embodiments only and is not intended to be limiting of the invention. Unless otherwise specifically defined herein, all terms are to be given their broadest possible interpretation including meanings implied from the specification as well as meanings understood by those skilled in the art and/or as defined in dictionaries, treatises, etc. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment and terminology was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method for generating new composite insight templates for explaining the results of one or more machine learning data analytic models comprising:
    running one or more machine learning data analytic models on a data set comprising one or more features to obtain for each of a plurality of entities, a risk score and feature-based insights supporting the risk score for said entity, wherein feature-based insights are generated by the one or more machine learning data analytic models based upon one or more features;
    generating a list of top "n" features input to the one or more machine learning data analytic models that contribute to the risk score for each entity;
    grouping entities based upon similar features input to the one or more machine learning data analytic models that contribute to the risk score for each entity, wherein grouping entities based upon similar features that contribute to the risk score for each entity comprises:
    listing, by entity identification, the top "x" features that contribute to the risk score for that entity;
    grouping, by entity identification, the same set of "x" features that contribute to the risk score; and
    identifying each grouping having the same set of "x" features that contribute to the risk;
    generating a decision tree for at least one of the group of entities for validation of the risk score results for the at least one of the group of entities;
    extracting, from the decision tree generated for the at least one of the group of entities, one or more feature-based insights;
    generating, by applying subject matter input, a new composite insight based upon the one or more feature-based insights extracted from the decision tree; and
    adding the new composite insight to insight templates and using the new composite insight added to the insight templates to explain the results of the one or more machine learning data analytic models.

2. The computer-implemented method according to claim 1, further comprising creating a composite feature as a new input feature to the one or more machine learning data analytic models.

3. The computer-implemented method according to claim 2, wherein creating a composite feature as new input feature comprises:
    determining one or more patterns to use to create one or more composite features;
    create a composite feature based upon each determined pattern; and
    add as a new feature input for the machine learning data analytics models at least one of the composite features.

4. The computer-implemented method according to claim 1, further comprising tracking the new composite insights.

5. The computer-implemented method according to claim 1, wherein the top "n" features that contribute to the risk score for each entity is generated by an explainability tool.

6. The computer-implemented method according to claim 1, wherein the top "n" features that contribute to the risk score for each entity is larger than a number "x" of similar features that contribute to the risk score for each entity.

7. The computer-implemented method according to claim 1, wherein generating a decision tree for at least one of the group of entities further comprises generating the decision tree for the at least one of the group of entities based upon a top "x" of similar features that contribute to the risk score for that group.

8. The computer-implemented method according to claim 7, wherein "x" is the top 3 features that contribute to the risk score for each entity in that group.

9. The computer-implemented method according to claim 1, wherein applying subject matter input comprises a user applying subject matter knowledge to interpret the one or more feature-based insights extracted from the decision tree.

10. A non-transitory computer readable medium comprising instructions that, when executed by at least one hardware processor, configure the at least one hardware processor to:
    run a machine learning program on a data set comprising one or more features to obtain for each of a plurality of entities, a risk score and feature-based insights supporting the risk score for said entity, wherein feature-based insights are generated by the one or more machine learning program based upon one or more features;
    generate a list of top "n" features input into the machine learning program that contributes to the risk score for each entity;
    group the entities based upon similar features input to the machine learning program that contributes to the risk score for each entity, wherein grouping entities based upon similar features that contribute to the risk score for each entity further comprising instructions that, when executed by at least one hardware processor, configure the at least one hardware processor to:
    list, by entity identification, the top "x" features that contribute to the risk score for that entity, where the top "x" features are a subset of the top "n" features that contribute to the risk score for that entity;
    group, by entity identification, the same set of "x" features that contribute to the risk score; and
    identify each grouping having the same set of "x" features that contribute to the risk score;
    generate a decision tree for at least one of the group of entities for validation of the risk score results for the at least one of the group of entities;

extract, from the decision tree generated for the at least one of the group of entities, one or more feature-based insights;

generate, by applying subject matter input, one or more new composite insights based upon the one or more feature-based insights extracted from the decision tree; and add the one or more new composite insights to insight templates and use the new composite insight added to the insight templates to explain the results of the machine learning program.

11. The non-transitory computer readable medium according to claim 10, further comprising instructions that, when executed by at least one hardware processor, configure the at least one hardware processor to:

create a composite feature as a new input feature to the machine learning program.

12. The non-transitory computer readable medium according to claim 11, wherein creating a composite feature as a new input feature comprises instructions that, when executed by at least one hardware processor, configure the at least one hardware processor to:

determine one or more patterns to use to create one or more composite features;

create a composite feature based upon each determined pattern; and add as a new feature input for the machine learning program at least one of the composite features.

13. The non-transitory computer readable medium according to claim 10, further comprising instructions that, when executed by at least one hardware processor, configure the at least one hardware processor to track the new one or more composite insights.

14. The non-transitory computer readable medium according to claim 10, wherein the top "n" features that contribute to the risk score for each entity is generated by an explainability tool.

15. The non-transitory computer readable medium according to claim 10, wherein the top "n" features that contribute to the risk score for each entity is larger than a number "x" of similar features that contribute to the risk score for each entity.

16. The non-transitory computer readable medium according to claim 10, wherein generating a decision tree for at least one of the group of entities further comprising instructions that, when executed by at least one hardware processor, configure the at least one hardware processor to generate the decision tree for the at least one of the group of entities based upon a top "x" of similar features that contribute to the risk score for that group.

17. The non-transitory computer readable medium according to claim 16, wherein "x" is the top 3 features that contribute to the risk score for each entity in that group.

18. A computer-implemented system to process data comprising:

a memory storage device storing program instructions; and a hardware processor coupled to said memory storage device, the hardware processor, in response to executing said program instructions, is configured to:

run a machine learning program on a data set comprising one or more features to obtain for each of a plurality of entities, a risk score and feature-based insights supporting the risk score for said entity, wherein feature-based insights are generated by the machine learning program based upon one or more features;

generate a list of top "n'" features input to the machine learning program that contributes to the risk score for each entity; group entities based upon similar features input to the machine learning program that contributes to the risk score for each entity, wherein grouping entities based upon similar features that contribute to the risk score for each entity further comprise configuring the at least one hardware processor to:

list, by entity identification, the top "x" features that contribute to the risk score for that entity, where the top "x" features are a subset of the top "n" features that contribute to the risk score for that entity;

group, by entity identification, the same set of "x" features that contribute to the risk score; and identify each grouping having the same set of "x" features that contribute to the risk score;

generate a decision tree for at least one of the group of entities for validation of the risk score results for each group entity;

extract, from the decision tree generated for the at least one of the group of entities, one or more feature-based insights;

generate, by applying subject matter input, a new composite insight based upon the one or more feature-based insights extracted from the decision tree;

add the new composite insight to insight templates and use the new composite insight added to the insight templates to explain the results of the machine learning program; and create a new composite feature as a new input feature to the machine learning program.

* * * * *